United States Patent [19]

Carver

[11] Patent Number: 5,350,425
[45] Date of Patent: Sep. 27, 1994

[54] METHOD OF REDUCING VAT DYES AND THE PROCESS OF DYEING FABRICS THEREIN

[76] Inventor: David R. Carver, 4620 Starboard Dr., Boulder, Colo. 80302

[21] Appl. No.: 104,492

[22] Filed: Aug. 9, 1993

[51] Int. Cl.$^5$ .................. C09B 67/28; C09B 9/04; C09B 7/00
[52] U.S. Cl. .......................... 8/465; 8/625; 8/651; 8/653; 585/266
[58] Field of Search ............. 8/465, 625, 650, 651, 8/653; 585/266

[56] References Cited

U.S. PATENT DOCUMENTS

| | | |
|---|---|---|
| 1,710,981 | 4/1929 | Hoffa et al. |
| 2,061,200 | 11/1936 | Lubs et al. ........................ 260/52 |
| 3,894,839 | 7/1975 | von der Eltz et al. ............ 8/651 |
| 4,166,717 | 9/1979 | Fono et al. ......................... 8/38 |
| 4,247,295 | 1/1981 | Patxot ............................... 8/465 |
| 4,283,198 | 8/1981 | Fletcher ............................ 8/653 |
| 4,966,977 | 10/1990 | Takaki et al. ..................... 548/457 |

FOREIGN PATENT DOCUMENTS 0201347 12/1986 European Pat. Off.

OTHER PUBLICATIONS

Manjrekar et al., Chemical Abstracts, vol. 66, p. 19806, Indian J. Chem. (1966).
Colour Index, Third Edition, vol. 4, 1971, pp. 4523, 4586, 4595, 4596, 4575, 4579, 4580.

*Primary Examiner*—Paul Lieberman
*Assistant Examiner*—Caroline L. Dusheck
*Attorney, Agent, or Firm*—Timothy J. Martin

[57] ABSTRACT

A process for reducing vat dyes, such as indigo, into their leuco form by placing a metal, such as aluminum, in water in the presence of a reduction facilitator to form a first solution after which a vat dye having the general structure $O{=}C({-}C{=}C{-})_N C{=}O$ where $N = 1$, 2 or 4 is mixed with the first solution to form a dye solution where substantially all of the vat dye is reduced to its soluble leuco form having the general structure $HO{-}C{=}(C{-}C)_N{=}C{-}OH$. The process includes dyeing fabric in the dye solution. the reduction facilitator may be a base, for example that produced hydroxide ions in water, and the first solution as well as the dye solution can be a basic solution. The soluble leuco can be isolated from the dye solution and dissolved in a non-aqueous solution. Prior to mixing the vat dye in water, it may first be dissolved in a solvent miscible with water.

20 Claims, No Drawings

METHOD OF REDUCING VAT DYES AND THE PROCESS OF DYEING FABRICS THEREIN

FIELD OF THE INVENTION

Generally, the field of this invention is the process of dyeing fabrics with a vat dye. Specifically, the present invention is related to the process of reducing vat dyes into their leuco form. More particularly, the present invention relates to the use of a metal reducing agent which is operative to reduce various vat dyes including indigo to their leuco form.

BACKGROUND OF THE INVENTION

Dyeing is as old as the textile industry and this antedates the written documents of human history. The natural desire of humans to clothe themselves goes hand in hand with the desire for beautiful, colorful clothing. There is historical evidence that indigo a vat dye, was used on the island of Crete as far back as 1600 B.C. for coloring clothing. Indigo remains the most widely recognized vat dye for dyeing clothing although most vat dyes have been in commercial use for at least 50 years.

Indigo was historically made from sea shells. Today the principle source of indigo is from plants which contain a compound called Indican. Indican is water soluble due to its glycoside linkage at the third position. To produce indigo from the plant material, the following procedure is generally used. The Indican is placed in an aqueous solution, the glycoside linkages are broken and 3-oxindole is released. The Indican/aqueous solution is then saturated with air which provides oxygen so that the 3-oxindole dimerizes to form the dye indigo. The dye, indigo, that is formed, is blue in color and is water insoluble. Likewise, the dye is practically insoluble in alcohol, ether or dilute acids. To use indigo to color textiles, it is necessary to reduce the indigo dye to its leuco form using a suitable reducing agent. This reduction usually occurs in an alkaline material, for example sodium hydroxide. Once the ,, leuco form of the dye is achieved the textile is immersed in the leuco solution and then exposed to air. These two steps, immersion and exposure may be repeated to obtain the desired shade of blue. Although there has been a widespread use of dyes for coloring fabrics, there is still a need to improve the existing dyeing processes and particularly a need to improve the step of reducing the dye to its soluble leuco form.

Typically, sodium dithionite has been employed to reduce the dyes to their leuco form, as is shown U.S. Pat. No. 3,798,172. Sodium dithionite decomposes rapidly in the presence or absence of air; therefore, large, excess quantities of this compound are used to reduce all of the dye and to maintain the dye in is soluble leuco form. Regrettably, the use of sodium dithionite raises ecological concerns.

Other reducing systems have been recommended for use by the textile industry. These include a highly alkaline solution containing five percent sodium borohydride and a powdered initiator of sodium formaldehyde sulfoxylate (Rongalite C) with five percent sodium nickel cyanide. There are some environmental concerns relating to the nickel and cyanide discharges from this dyeing process. Another reducing agent that has received some attention is thiourea dioxide in an alkaline solution. However, thiourea dioxide is a strong reducing agent, and therefore tends to over reduce the vat dye. When reducing indigo overreduction is readily apparent by the smell of fecal material which is present when indole (the overreduction product) is in the reaction.

The reduction process is sensitive to slight changes in pH, temperature, and the amount and purity of the material being reduced. If the pH is too low, the dye may precipitate in its acid form. If sodium dithionite is used in too low a concentration, the dye may oxidize prematurely, resulting in a loss of the dye. Therefore, despite the fact that vat dyes have been known for years, the quest for an optimal, inexpensive reducing process which does not have environmental concerns attached to its use or which does not result in overreduction is ongoing.

Because the industry has not found an acceptable process for forming the leuco form of vat dyes the industry has turned to the formation of indigosols, the sulfuric esters of the leuco form of vat dyes. The reduction and esterification of the vat dye produces the sulfuric ester instead of the leuco form of the vat dye. Pyridine with iron and chlorosulfuric acid are agents employed to form the sulfuric ester having the general structure of

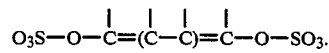

The industry would prefer to form the leuco form of the vat dye instead of forming the ester to avoid adding expense to the dyed fabric.

The present invention provides an optimal reducing process for formation of the leuco form of the vat dye. Thus eliminating the need to form sulfuric esters.

SUMMARY OF THE INVENTION

An object of the present invention is to form a new and useful method of reducing vat dyes to their leuco form.

Still another object of the present invention is to provide a method of dyeing fabrics which includes an environmentally friendly byproducts.

Still a further object of this invention is to provide an inexpensive reducing process for the reduction of dyes including indigo to their leuco form.

Further, another object of the present invention is to provide a fabric dyeing process which employs relatively inexpensive reducing agents.

Another object of the present invention is to use reducing agents in the reduction process that permit substantially all of the indigo to be reduced to the leuco form with substantially no overreduction to the indole form.

Yet another object of the present invention is to provide a reaction that can use commercial grade reduction agents.

Broadly then, the present invention is a process for reduction of vat dyes into their leuco form. This process includes the following steps: placing a metal, preferably aluminum, in water in the presence of a reduction facilitator thereby forming the first solution; and mixing a vat dye having the general structure

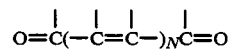

where N=1, 2, or 4 with the first solution to form a dye solution with substantially all of the vat dye being reduced to its soluble leuco form. The leuco form having the general structure

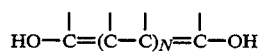

where the N remains the same integral as the N in the vat dye.

The present invention is also a process for dyeing fabric including the steps of placing metal, preferably aluminum, in water in the presence of a reduction facilitator to form a first solution, mixing a selected vat dye having the general structure

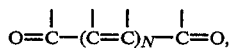

where N is selected from the integers 1, 2, and 4, into said first solution to form a dye solution wherein substantially all of the vat dye is reduced to a soluble leuco form having the general structure

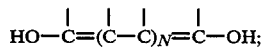

dyeing fabric in the dye solution; and drying said fabric wherein said leuco form is oxidized thereby imparting color to the drying fabric.

More specifically, the present invention is a process for reduction of indigo into its leuco form. This process has the following steps: placing aluminum in water in the presence of a reduction facilitator to form a first solution; and mixing indigo with the first solution to form a dye solution wherein substantially all of the indigo is reduced to the soluble leuco form.

The method of the present invention can be employed in a fabric dyeing process if after the first two steps, ie., forming the first solution and the dye solution, are completed, the following steps are taken: dyeing the fabric in the dye solution; and drying the fabric wherein the leuco form is oxidized imparting color to the fabric. More particularly, the reduction reaction can include a reduction facilitator which is a base that produces hydroxide ions in water. Likewise, the first solution can be a basic solution; and, or the dye solution can be a basic solution. When the reduction facilitator is a form of energy such as ultrasonic mixing, electrolytic reduction, or the like, the process can include the step of isolating the soluble leuco form from the dye solution. Then the isolated soluble leuco form can be dissolved in a non-aqueous solution and used in the dyeing process.

Likewise, in dyeing the fabrics, there can be an additional step of adding a solvent operative to enhance the solubility of the leuco form in the dye solution prior to placing the fabric in the dye solution. Furthermore, the method can include the step of filtering the dye solution to remove any metal which is undissolved in the dye solution prior to placing the fabric in the dye solution. Additionally, the process can include the step of adjusting the pH of the dye solution in accordance with the type of vat dye and the type of material to be dyed therein. The preferred vat dye in these processes is indigo. Prior to placing the indigo into the first solution the indigo can be dissolved in a solvent. Preferably the solvent is miscible with water. The solvent is selected from a group consisting of a alcohols, amides and esters.

DETAILED DESCRIPTION OF THE EMBODIMENTS

The use of natural dyes to change the color of fabric has been historically known. The dyeing industry has used vat dyes for centuries. There remains a variety of vat dyes used by today's textile industry for dyeing fabric. Probably one of the most notable vat dyes, because of its use in blue jeans, is indigo. Generally, a vat dye is extracted from a plant compound. To produce the vat dye, it may be necessary to process the plant extract. Although vat dyes are practically insoluble in water upon reduction or vatting, they are reduced to a leuco form, which is soluble in aqueous alkali and thus useful for dyeing fabric. The fabric is dyed in the leuco form of the vat dye, and it is allowed to be oxidized in the air which reforms the original dye onto the fibers of the fabric imparting color thereto.

Characteristically, vat dyes contain a chain of conjugated double bonds with two ketos groups in the end positions. Vat dyes have the following characteristic chemical structure:

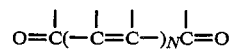

N = 1: indigo, benzo, naphtho and anthraquinone
N = 2: anthanthrone, dibenzpyrenequinone, etc.
N = 4: pyranthrone, dibenzanthrone, dipyrazolanthrone, etc.

The leuco form of a vat dye is

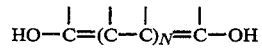

where the N is the same integer as the vat dye. The leuco form is a dihydro derivative of the vat dye as diols (vat acids). The leuco derivatives are very sparingly soluble in water. However, because the hydroxyl groups have an enol character, the vat acids are acidic ($pK_a = 9-11$). Thus, they dissociate in alkaline media and form soluble enolates. As is noted above, when n=1, the vat dye can be indigo. Indigo has the structure shown below:

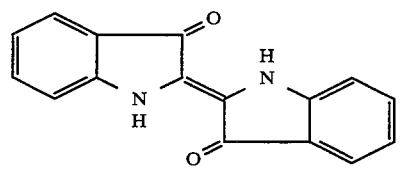

The leuco form of indigo has the structure shown below:

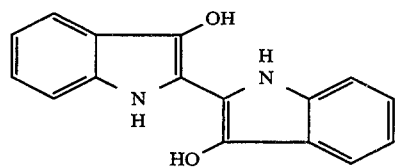

The sodium hydroxide causes the relatively strong acid of the leuco form $pK_a=9-11$ to ionize and become soluble in water. As can be seen in the drawing above, the carbon double bond has been broken to form the leuco indigo.

There are basically five reducing methods that have been used by the industry or noted in literature for reducing vat dyes to the leuco form. These include the use of: (1) sodium hydrosulfite (sodium dithionite); (2) ($Na_2S_2O_4$) in an alkali solution; (3) sodium hydrosulfite and formaldehyde (Rongalite C); (4) sodium borohydride and a powdered initiator of sodium formaldehyde sulfoxylate (Rongalite C) with five percent sodium nickel cyanide; (4) thiourea dioxide; and (5) endiols such as hydroxyacetone with ultrasonic mixing. Each of these reducing agents either have negative environmental implications or are simply prohibitively expensive. Thus, there has been a continuing search for an inexpensive environmentally sound reducing agent to form the leuco form from the vat dye.

The process of the present invention reduces vat dyes to their leuco form. The preferred process reduces indigo to the leuco indigo. Generally, the process consists of placing metal in water in the presence of a reduction facilitator to form a first solution. The vat dye is then mixed into the first solution to form a dye solution. The dye solution contains the vat dye in its leuco form. Preferably, the process is employed with the vat dye indigo. The preferred method of reducing indigo to its leuco form is as shown.

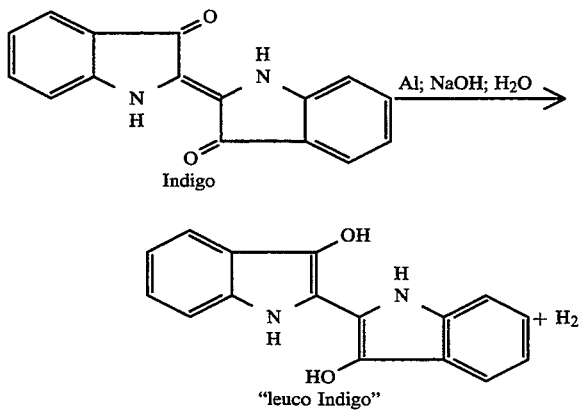

Aluminum is placed in $H_2O$ and a water/NaOH solution is added. This forms the first solution. The first solution is stirred and is preformed at room temperature 25° C. It should be noted other temperatures can be employed. Within two to five minutes, hydrogen gas will begin to evolve. Hydrogen gas must be vented to avoid any explosive reactions. After the hydrogen gas begins to evolve, the indigo is added to the mixture. The indigo can be added lump wise or as small portions. Alternatively, the indigo can be dissolved in a solvent and added as a liquid. The selected solvent should not adversely effect the reducing reaction. After the indigo is added to the first solution, the dye solution is formed. The dye solution is stirred to permit the reducing reaction to go to completion. The completion of the reaction is evidenced by the lack of insoluble vat dye in the dye solution. Addition of aluminum may be necessary to complete a reaction that contains unreduced vat dye.

Increasing the percent of the base greatly facilitates the reduction process as evidenced in the example below.

The present invention uses a metal as a reducing agent. The preferred metal is aluminum. Other metals that could be employed in the present method are Sn, Mg and Ca. The use of other metals may substantially decrease the percent of vat dye that is reduced to the leuco form. Generally, other metals in the 1A, 11A, 111A, 1B, 11B areas of the periodic table could possibly be used though their effectiveness would have to be individually tested to determine the optimal ratios for the process. Finely divided metals often are treated with mercury. Due to the environmental hazards associated with mercury, these metals are not preferred. The aluminum employed in the examples below was aluminum foil purchased from the grocer. Lesser grades of aluminum can be employed.

In the method of the present invention, the aluminum is placed in water and stirred in the presence of a reduction facilitator. The reduction facilitator is operative to permit a fresh metal surface to come in contact with the water such that the metal reduction continuously takes place. Examples of reduction facilitators include ultrasonic mixing of the solution, the use of a base that would produce hydroxide ions in the water, and the use of energy as in an electrolytic reduction.

The preferred method of the present invention uses sodium hydroxide (caustic soda) as the reduction facilitator. Almost any commercial grade of sodium hydroxide can be employed, to reduce expense. When the vat dye is placed in contact with the metal, preferably aluminum, and the sodium hydroxide and water solution, there is, of course, the evolution of hydrogen gas, which must be ventilated according to the known art in the industry.

The sodium hydroxide is used to provide an alkaline solution in which the leuco form of the vat dye is soluble. Since hydroxide ions are constantly reacting with the vat dye and the reducing agent, it may be necessary to add additional hydroxide ions during the reduction process to permit all of the leuco form to go into solution.

Alternatively, if an alternative reduction facilitator is used, the leuco form will not dissolve in water and thus, the leuco form must be isolated from the solution. If ultrasonic dissolution or electrolytic reduction is used, the leuco form will remain insoluble in the solution, and the leuco form may be isolated and placed in a non-aqueous solution. Non-aqueous solutions often have more affinity for fabric than do aqueous solutions. Thus, the use of alternative reduction facilitators in the process results in an isolated leuco form that can be dissolved in a non-aqueous solution.

Additionally, co-solvents can be added to either the dye solution to the indigo. Co-solvents such as alcohol, amides, esters, or other well known solvent groups that are miscible in water and enhance the solubility of the vat dye or of the leuco form of the vat dye can be employed.

After the reduction facilitator is employed, there should begin to be an evolution of hydrogen. When this is evident, this first solution is ready for the addition of the vat dye. The vat dye can be added as a powder, in a one-lump portion or portion wise. Alternatively, the vat dye may be dissolved in a solvent such as ethanol or methanol and added as a liquid to the first solution. A variety of different solvents for dissolving the vat dye are known to those in the industry. Any solvent can be used as long as it enhances the solubility of the vat dye and is miscible in water, and does not interfere with the ongoing reduction.

After the vat dye is added to the first solution, the leuco form of the vat dye is formed by a reduction of the vat dye. The dihydro derivative of the vat dye, i.e. the leuco form, is produced by the reduction process. The dihydro derivative in the solution forms a dye solution. The dye solution can include optional ingredients to facilitate dyeing of the fabric. For example, compounds such as Nekal NF can be added to reduce surface tension and to permit the fabric to readily be impregnated with the dye solution. Additional co-solvents can be added to enhance the solubility of the leuco form in the dye solution. These can include such things as alcohol, amides, and esters. Also, sodium chloride may be added to increase the affinity of the dye solution for the textile. Alternatively, a thickening agent, often a polymeric material, may be added to increase the viscosity of the reducing agent of the dye solution.

The fabric is immersed in the dye solution, which contains the reduced vat dye or indigo (in the leuco form), water and a base, preferably sodium hydroxide. "Fabric" is defined to include, without limitation, cotton, wools, and cotton blended with synthetics or other fibers such as rayon, polyacrylonitrile, and polyesters. The method of dyeing these fabrics is well known. They can include, without limitation, vat or continuous dyeing processes. There are processes that are called pad-steam, pad-batch, and long bath to name a few. Depending on which dyeing process is used, a variety of different temperature ranges can be employed. The reduced dye solution is usually between room temperature or 25° C. to 110° C. when the cloth is immersed therein. Preferably, the dye solution temperature is around 25° C., though 60° C. is commmon. Again, depending on which type of process for dyeing is employed, a variety of fabric process time can be employed. Immersion of the fabric in the dye solution frequently ranges from 30 minutes to 6 hours.

Additional steps may be included in the general process described above. Because the dye solution may contain small bits and pieces of aluminum or other solids that have not been reduced, they may be processed through a filtration step prior to immersion of the fabric in the dye solution. The various methods for filtering solutions are well-known to those skilled in the art. Filtration simply requires some type of a filter that will remove the small bits of aluminum or other metal that may be in the dye solution.

Additionally, when dyeing fabric, the method can include the step of adjusting the pH of the dye solution according to the type of fabric that is being dyed. The correct pH for varieties of fabrics are well-known to those skilled in the art. After the fabric has been dipped or immersed into the dye solution and removed, the fabric is allowed to drain. Then the fabric can be dipped into a dilute 0.1 M solution of acetic acid. Then the fabric is again allowed to drain. The fabric can then be dipped into a rinse solution to remove residue and excess acid. The fabric is then allowed to air-dry oxidize. The oxidation results in the desired coloration.

Depending on the type of fabric that is being dyed, I have found that the use of formic acid allows the oxidation of the leuco dye solution to proceed more rapidly in the air. After the fabric is dipped into the dye solution and allowed to drain, the fabric can be dipped into a dilute 0.1 M solution of formic acid instead of using acetic acid. The fabric is again allowed to drain. Then the fabric can be dipped into a rinse solution of water to remove residual and excess formic acid solution. Because indigo does not have a strong affinity for either wool or cotton fibers, the process for dyeing the fabric involves a repetition of the immersion process. Other dye solutions which use different vat dyes do not necessarily require a repetition of the dyeing process as they have more affinity for the fabric fibers than does the leuco form of indigo.

The following examples are submitted to illustrate but not to limit the invention.

EXAMPLE 1

An indigo dye stock solution was prepared. One gram of aluminum was added to one hundred ml of water. The solution was stirred, and five grams of fifty percent sodium hydroxide/$H_2O$ was added. After a short period of time, approximately two to five minutes, the evolution of hydrogen was evident. Then one gram of solid indigo was added to the solution in a lump portion. The solid indigo was stirred for approximately one-half hour at 25° C. The solution became de-colorized from its original blue color of the indigo into a greenish-yellow color of the leuco form of indigo which is dihydroindigo. There was no overreduction of the indigo as the smell of fecal material was not present. There was 100% reduction as all the insoluble vat dye visibly went into solution.

EXAMPLE 2

An indigo dye stock solution was prepared by mixing 1 gram of aluminum in 0.15% NaOH in water with reduction of 1 gram of indigo. The indigo was stirred for approximately one-half hour at 25° C. The reaction was very slow, only 5% or less of the indigo was reduced over a period of 24 hours.

EXAMPLE 3

An indigo dye stock solution was prepared by mixing 1 gram of aluminum in 0.5% NaOH in water with reduction of 1 gram of indigo. The indigo was stirred for approximately one-half hour at 25° C. Reaction was also very slow as it was in the case of Example 2. Over a period of 24 hours, 5% of the indigo was reduced.

EXAMPLE 4

An indigo dye stock solution was prepared by mixing 1 gram of aluminum in 2.5% NaOH in water with reduction of 1 gram of indigo. The indigo was stirred for approximately one-half hour at 25° C. Reaction was faster than in Example 2 or 3. Over a period of 4 to 5 hours, approximately 50% of the indigo was reduced. Further addition of aluminum did not increase the amount of reduction.

EXAMPLE 5

An indigo dye stock solution was prepared by mixing 1 gram of aluminum in 5% NaOH in water with reduction of 1 gram of indigo. The indigo was stirred for approximately one-half hour at 25° C. The solution de-colorized from the blue color of indigo to the greenish-yellow of the leuco form. Reaction was very fast compared to Examples 2, 3, and 4. In a 40–45 minute period, almost all of the indigo was reduced. Further addition of 0.5 gram of aluminum assisted completion of the reaction.

EXAMPLE 6

An indigo dye stock solution was prepared by mixing 1 gram of aluminum in 15% NaOH in water with reduction of 1 gram of indigo. The indigo was stirred for approximately one-half hour at 25° C. Reaction of the aluminum with the NaOH was extremely fast. The solution de-colorized from the blue color of indigo to the greenish-yellow color of the leuco form. Vigorous evolution of hydrogen was evident and the indigo was reduced in less than 5 minutes. Another 0.5 gram portion of aluminum was necessary for the reduction to be completed.

As can be seen in the above examples if the reaction facilitator is NaOH the preferred strength is 2.5% or more. However, smaller percentages of NaOH can be employed. Weaker bases would of course, require higher percentages.

Addition of noble metals to increase the reduction of the vat dye to its leuco form have been performed. Many noble metals are known to be hydrogenation catalysis. In particular, Rh (rhodium), Pd, Pt and nickel are well known to effect this type of reduction. A small amount of finely divided palladium catalysis on carbon was added to one of the aluminum reductions. The reduction proceeded very well (faster). However, the solution would require filtration prior to the dyeing along with recovery of the palladium, and is therefore not as desirable as a more simple procedure.

Having set forth the general nature and specific methods of the present invention, the true scope of the invention is now particularly pointed out and claimed below.

I claim:

1. A process for chemical reduction of a vat dye into its leuco form which comprises the steps of:
   placing aluminum metal in water in the presence of a chemical reduction facilitator to form a first solution; and
   mixing a selected vat dye having the general structure

where N=1,2 or 4 into said first solution to form a dye solution wherein substantially all of the vat dye is reduced to its soluble leuco form having the general structure

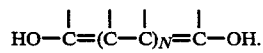

2. A process for chemical reduction according to claim wherein said chemical reduction facilitator is a base.

3. A process for chemical reduction according to claim 2 wherein said base produces hydroxide ions in water.

4. A process for chemical reduction according to claim 1 wherein the first solution is a basic solution.

5. A process for chemical reduction according to claim 1 wherein the dye solution is a basic solution.

6. A process for chemical reduction according to claim 1 including isolating the soluble leuco form from said dye solution.

7. A process for chemical reduction according to claim 6 including dissolving the isolated soluble leuco form in a nonaqueous solution.

8. A process for chemical reduction according to claim 1 where said chemical reduction facilitator is operative to ultrasonically dissolve said aluminum.

9. A process for chemical reduction according to claim 1 including dissolving said vat dye in a solvent prior to mixing said vat dye with said first solution.

10. A process for chemical reduction according to claim 9 wherein said solvent is miscible with water.

11. A process of chemical reduction according to claim 9 wherein said solvent is selected from the group consisting of amides and esters.

12. A process of chemical reduction according to claim 1 including the step of adding a solvent operative to enhance the solubility of the leuco form in the dye solution.

13. A process of chemical reduction according to claim 1 including the step of filtering said dye solution to remove any aluminum which was undissolved in said dye solution.

14. A process of dyeing fabric to impart a color to the fabric, the process comprising the steps of:
   a) placing metal selected from the group consisting of Al, Sn, Mg, and Ca, in water in the presence of a chemical reduction facilitator to form a first solution;
   b) mixing a selected vat dye having the general structure

where N is selected from the integers 1, 2, and 4, into said first solution to form a dye solution wherein substantially all of the vat dye is reduced to a soluble leuco form having the general structure

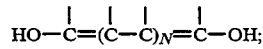

c) dyeing fabric in the dye solution; and
   d) dyeing said fabric wherein said leuco form is oxidized imparting color to the fabric.

15. A process of dyeing fabric according to claim 14 including the step of adjusting the pH of said dye solution according to the fabric dyed therein.

16. A process for chemical reduction of indigo into its leuco form which comprises the steps of:
   (a) placing aluminum metal in water in the presence of a reduction facilitator to form a first solution; and
   (b) mixing indigo having this structure

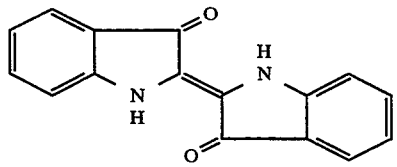

with the first solution to form a dye solution wherein substantially all of the indigo is reduced to the soluble leuco form having this structure:

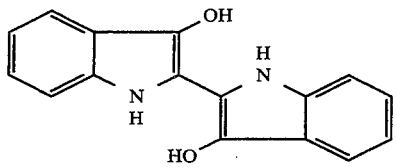

17. A process for dyeing fabric to impart a color to the fabric, the process comprising the steps:

(a) placing aluminum metal in water in the presence of a chemical reduction facilitator to form a first solution;

(b) mixing indigo having the structure

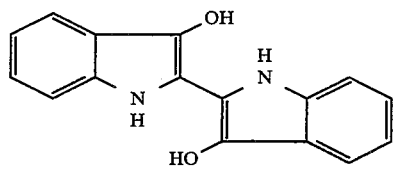

with the first solution to form a dye solution wherein substantially all of the indigo is reduced to the soluble leuco form having this structure:

(c) dyeing fabric in the dye solution; and
(d) and drying said fabric wherein said leuco form is oxidized imparting color to the fabric.

18. A process of dyeing fabric according to claim 17 including the step of adjusting the pH of said dye solution according to the fabric dyed therein.

19. A process of dyeing fabric according to claim 17 including the step of dipping the fabric in formic acid prior to drying the fabric.

20. A process of dyeing fabric according to claim 17 including the step of filtering the dye solution prior to dyeing the fabric.

* * * * *